United States Patent Office 3,502,460
Patented Mar. 24, 1970

3,502,460
PRODUCTION OF ANOSOVITE FROM
TITANIFEROUS MINERALS
Ian Douglas Martin, Maida Vale, Western Australia, and Harry William Hockin, Capel, Western Australia, Australia; said Martin assignor to Commonwealth Scientific and Industrial Research Organisation, East Melbourne, Victoria, Australia, a body corporate, and said Hockin assignor to Western Titanium N.L., West Perth, Western Australia, Australia
No Drawing. Filed Apr. 27, 1967, Ser. No. 634,126
Claims priority, application Australia, Apr. 29, 1966, 4,897/66
Int. Cl. C21b *1/00;* C22b *1/00*
U.S. Cl. 75—1                           11 Claims

ABSTRACT OF THE DISCLOSURE

A process for producing a readily separable mixture of anosovite and metallic iron from ilmenite or other titaniferous mineral.

This invention relates to a method of treating titaniferous minerals such as ilmenite, rutile, or alteration products thereof so as to convert them largely to a material which contains a high proportion of titanium in the trivalent state and has a much higher degree of solubility in dilute acids than the original mineral. The material so formed is suitable for the production of titanium oxide pigment by either the conventional acid process or the more recently developed chloride vapour phase process.

Ilmenite is a mineral composed largely of iron titanate ($FeTiO_3$) in which ferrous iron predominates over the ferric form. It may also contain minor amounts of various elements such as manganese, magnesium, chromium and vanadium. According to the conditions of heat treatment of the natural mineral or its synthetic equivalent, the ratio of ferric to ferrous iron present in the heat treated product may vary from 0.1 to 1.0. The titanium present in the natural mineral is essentially in the tetravalent state. The alteration products of ilmenite generally show a higher $TiO_2$ content, a higher ferric to ferrous iron ratio and are sometimes referred to as leucoxene. Rutile is a mineral containing 95–100% $TiO_2$ generally with minor amounts of various other elements.

Ilmenite is the main raw material used for the preparation of titanium dioxide white pigments, but suffers from certain disadvantages in this type of application. It does not yield more than 60% of titanium dioxide on a weight basis, because of the high proportion of oxygen and iron atoms associated with the titanium atoms present in any representative portion of the structure of any given sample of the mineral. Also, the structure of the mineral is such as to make it difficult to dissolve in mineral acids. In the usual process of pigment manufacture, the initial digestion of ilmenite is accomplished by the use of strong sulphuric acid at high temperatures, a step well known to be rather unpredictable, dangerous and often inefficient. Also, since the iron in the mineral is necessarily taken into solution at the time of this initial digestion, problems arise in the subsequent separation and disposal of the unwanted ferrous sulphate so produced. Rutile and leucoxene are generally insoluble in acid and cannot be used efficiently in pigment production by the acid process.

The present invention is concerned with a method of pre-treating titaniferous minerals to produce a particular phase called "anosovite," this phase containing substantially all the titanium values originally present in the feed material. The other main phase produced in this treatment is metallic iron, which may be separated physically or chemically from the anosovite in any one of a number of subsequent steps which have been previously described in the literature.

Anosovite as herein referred to is a material of the type originally described and so named by Tagirov, who found it present in recognizable crystal forms dispersed through slags rich in CaO and $TiO_2$. The Tagirov report is shown in article by E. V. Britske, K. Kh. Tagirov and I. V. Shmanenkov. Izv AK SSR OTN No. 1–2 1941. (Bull. of the U.S.S.R. Ac. of Sciences Div. of Tech. Sciences No. 1–2 1941). It is essentially a stabilized variety of the high-temperature form of $Ti_3O_5$, having the structure of pseudobrookite. It has the composition:

$$(AO.2TiO_2)_x \cdot (B_2O_3.TiO_2)_y$$

where A is Mg, divalent Mn, Ti or Fe, and where B is Al, or trivalent Ti or Cr.

The content of the oxide component AO in the defined composition must be sufficient to preserve the substance in a deformed orthorhombic structure as it cools from its formation temperature to room temperature, otherwise it will invert at temperatures below 177° C. to a low-temperature monoclinic form of $Ti_3O_5$ accompanied by small amounts of rutile. On an atomic basis, that is, on the basis of number of cations present in a unit of the formula the minimum proportion of the component "A" cations that must be present in the anosovite to prevent inversion is 0.04 of the total number of cations in the unit. Thus, the value of $x$ is determined by the proportion of component "A" cations present in a unit of the formula, and since $x+y=1$ in such a unit, $y$ is also determined. The relative proportions of $x$ and $y$ in the formula may be varied over a wide range according to the amounts of A and B introduced and also the temperature of formation of the substance.

Although processes for the reduction of ilmenite to various mixtures of metallic and oxide or sulphide phases are known, the titanium-bearing phases produced by these processes have always been materials which to our knowledge, either resist digestion in strong mineral acids but contain more than 75% by weight of $TiO_2$, or show a higher degree of acid-solubility at a $TiO_2$ content less than 75%. The rutile phases produced in previous processes designed to reduce ilmenite in solid granular form are examples of the first type of product in which a high content of $TiO_2$ is coupled with extreme resistance to acid digestion. Slags formed in processes whereby ilmenite is smelted with fluxes and reducing agents are examples of the second type of product, which can be digested by mineral acids under ordinary conditions of pigment manufacture but contain less than 75% of $TiO_2$ because of the quantity of flux necessarily remaining in the slag.

An object of our present invention is to produce a titaniferous material containing from 75% to 100%, and preferably from 90% to 100%, of its weight in a form "equivalent" to $TiO_2$, but also having a high rate of digestion in sulphuric acid in the conventional "acid" process for pigment manufacture. By "equivalent" we mean that the material does not necessarily contain $TiO_2$ as such in its structure but on digestion in sulphuric acid, followed by steps of oxidation and hydrolysis of the solution, a certain dry weight of $TiO_2$ can be obtained and expressed as a percentage of the original weight of the material used in the digestion step. This percentage we term the "$TiO_2$-equivalent" of our product as a means of expressing its potential content of titanium values.

Since there are well-known techniques available for separating metallic iron from a mixture containing a non-metallic phase, a specific aim of the present invention is to produce such a mixture wherein the non-metallic phase is an acid-soluble titaniferous material containing titanium values "equivalent" to from 75% to 100%, and preferably from 90% to 100%, of its weight.

According to this invention, we provide a process for producing a titaniferous material of the type referred to from a titaniferous mineral such as ilmenite, rutile, or an alteration product thereof, in which the mineral in granular form is pre-heated in an oxidizing atmosphere at a temperature within the range of between 950° C. and 1320° C. in the presence of a magnesium compound in an amount such that the mineral grains become coated with a zone of magnesian pseudobrookite, thereafter heating the product of the pre-heating stage with a reducing agent at a temperature of at least 1130° C. to produce a mixture of metallic iron and anosovite, the reducing step being carried out in the presence of sufficient divalent ions selected from the group consisting of magnesium, iron, titanium and manganese to ensure that the proportion of "A" in the cations of the anosovite product as hereinbefore defined is at least 0.04. It has been found that the anosovite thus produced comprises a titaniferous material having the titanium content and solubility characteristics referred to above.

The reducing step of the process is preferably carried out in a rotary kiln, and the production of zones of magnesian pseudobrookite on the surfaces of the mineral grains is very important because the refractory nature of these zones prevents agglomeration of the material in the rotary kiln.

The addition of a sodium salt to the charge during the reduction step is beneficial as regards the distribution of metallic iron in the product, but is not essential to the process. The salt may be sodium chloride or sodium sulphate.

The magnesium compound is normally a salt, the preferred compound being magnesium carbonate. If more than the equivalent of 3.0% MgO is added, difficulties may arise in obtaining anosovite which will yield the desired equivalent TiO₂ content of at least 90%. The presence of at least the equivalent of 0.6% of MgO in the pre-heating stage ensures that sufficient divalent ions are present in the reducing stage for the production of anosovite.

Preferably, the reduction stage is carried out at a temperature between 1200° C. and 1300° C. Carbon is the preferred and usual reducing agent.

The lower limit of the temperature range of the pre-heating stage is related to the minimum temperature of formation of magnesian pseudobrookite, whilst the upper limit is determined by the onset of sintering effects which would make the heating difficult in practice. The pre-heating may conveniently be performed in air for at least one hour.

The convenient upper limit of the temperature range in the reduction step is selected as 1320° C. because above this temperature, production difficulties, particularly agglomeration, will prevent the use of a rotary kiln. Also increasing amounts of the carbides and nitrides of titanium and iron are generated at temperatures above this limit and such compounds constitute undesirable phases in the product.

The lower limit of the temperature range in the reduction step, 1130° C., is determined by the maximum temperature at which an acid-insoluble phase, "Tagirovite," can exist in equilibrium with carbon. Tagirovite is $Ti_2O_3$ having the structure of corundum, and below 1130° C., will persist as a most undesirable component of the products of reduction of most titaniferous ores. The preferred form of this invention is thus to provide a method of conditioning titaniferous ores by coating them with a refractory layer of magnesian pseudobrookite so that they can be handled in a rotary kiln, without agglomeration, at temperatures which prevent the appearance of tagirovite.

In typical procedures for carrying out the process according to this invention, grains of rutile, ilmenite, alteration products thereof, or any mixture of these minerals having a diameter of between 50 and 500 microns are heated in air with between 0.6 and 3.0% by weight of magnesium carbonate calculated as MgO. At 950° C., the pre-heat period would generally be from 1 to 2 hours, whilst at 1300° C. a period of from 10 to 30 minutes would normally suffice.

On completion of the pre-heat, the product is fed to a rotary kiln containing sufficient carbon to give a reduction mixture, by weight, of one to two parts of the pre-heated product to one part of carbon. The temperature of the reduction kiln is maintained between 1200° C. and 1300° C. and the residence time of the charge at this temperature is from 1½ to 2 hours, the material being fed out of the heating zone into an integral cooler in which the atmosphere is maintained substantially free of oxygen until the product temperature falls below 100° C. The product is substantially a mixture of anosovite and metallic iron. On separating the metallic iron from the mixture by any suitable means and dissolving the anosovite fraction in sulphuric acid, the "equivalent" composition range of the anosovite was determined to be as follows:

| Equivalent: | Percent by weight |
| --- | --- |
| $TiO_2$ | 90–103 |
| FeO | 0.2–6.3 |
| MgO | 0.2–3.7 |
| MnO | 1.3–1.7 |
| $SiO_2$ | 0.6–1.8 |

These anosovite samples were produced from titaniferous ores containing various impurities, as is evident from the analysis above. The total amount of divalent oxides present and capable of stabilizing the anosovite structure (FeO+MgO+MnO) is considerably in excess of the minimum requirement of 0.04 (atomic), but this is largely an indication that in the reduction step, segregation of iron into a discrete metallic phase was not perfectly achieved. The reasons for this concern the use of lignitic coal char as the form of carbon used in the example described and also the use of a rotary kiln not perfectly sealed ingress of some free oxygen.

It is to be understood that the inventive concept herein disclosed is not to be limited by reference to the positive terms of the typical embodiments, but resides in the use of a combination of conditions of heat treatment and conditions of heat treatment and conditioning in an oxidising atmosphere followed by thermal reduction in the presence of a reducing agent at a temperature of at least 1130° C., resulting in the segregation of iron in the metallic state and conversion of the titanium values in the ore to the form of anosovite.

We claim:

1. A process for producing a titaniferous material from a titaniferous mineral which is ilmenite, rutile, or an alteration product thereof, comprising pre-heating the mineral in granular form in an oxidizing atmosphere at a temperature within the range of between 950° C. and 1320° C. in the presence of a magnesium compound in an amount such that the mineral grains become coated with a zone of magnesium bearing pseudobrookite, thereafter heating the product of the pre-heating stage with a reducing agent at a temperature of at least 1130° C. to produce a mixture of metallic iron and anosovite, said anosovite having the formula: $(AO.2TiO_2)_x \cdot (B_2O_3.TiO_2)_y$ wherein A is Mg, divalent Mn, Ti or Fe and B is Al, or trivalent Ti or Cr said reducing step being carried out in the presence of sufficient divalent ions selected from the group consisting of magnesium, iron, titanium and manganese to ensure that the proportion of A in the cations of the anosovite is at least 0.04.

2. A process as in claim 1, characterized in that the magnesium compound is present in an amount of at least 0.6% by weight calculated as MgO.

3. A process as in claim 2, characterized in that the magnesium compound is present in an amount of between 0.6% and 3.0% by weight calculated as MgO.

4. A process as in claim 2, characterized in that the magnesium compound is added in the form of magnesium carbonate.

5. A process as in claim 2, characterized in that the metallic iron is subsequently separated from the anosovite.

6. A process as in claim 2, characterized in that the reducing treatment is carried out at a temperature of less than 1320° C.

7. A process as in claim 6, characterized in that the product of the pre-heating stage is mixed with carbon to give a reduction mixture comprising between one and two parts of the pre-heated product per part of carbon by weight.

8. A process as in claim 7, characterized in that the reducing treatment is carried out at a temperature between 1200° C. and 1300° C.

9. A process as in claim 1, in which the reducing treatment is carried out by rotating the product of the pre-heating stage.

10. A process as in claim 9, characterized in that the product of the reducing treatment is fed after said rotation to a cooling zone in which the atmosphere is kept substantially free of oxygen until the product temperature has fallen below 100° C.

11. A process as in claim 1 characterized in that a sodium salt is added to the charge during the reduction step.

References Cited

UNITED STATES PATENTS

| | | | |
|---|---|---|---|
| 1,542,350 | 6/1925 | Whittemore | 23—202 XR |
| 1,793,501 | 2/1931 | Lubowsky | 23—202 |
| 1,843,427 | 2/1932 | Lubowsky | 23—202 XR |
| 1,937,822 | 12/1933 | Jones | 75—1 |
| 2,631,941 | 3/1953 | Cole | 75—1 XR |
| 2,876,074 | 3/1959 | Johnson | 23—202 |
| 2,990,250 | 6/1961 | Moklebust et al. | 23—202 |
| 3,112,178 | 11/1963 | Judd | 23—202 |
| 3,291,599 | 12/1966 | Reeves | 23—202 XR |

OTHER REFERENCES

Chemical Abstracts, vol. 35 (1941), pp. 7331 and 7332.

EDWARD STERN, Primary Examiner

U.S. Cl. X.R.

23—51, 202